J. N. STACY.
Grain-Testing Device.

No. 217,165.                     Patented July 1, 1879.

Witnesses:—
H. N. Low.
N. H. Bliss

Inventor:
James N. Stacy
by Charles & Geo. A. King
attys

UNITED STATES PATENT OFFICE.

JAMES N. STACY, OF MONTICELLO, MINNESOTA.

IMPROVEMENT IN GRAIN-TESTING DEVICES.

Specification forming part of Letters Patent No. 217,165, dated July 1, 1879; application filed April 14, 1879.

*To all whom it may concern:*

Be it known that I, JAMES N. STACY, of Monticello, in the county of Wright and State of Minnesota, have invented certain new and useful Improvements in Grain-Testing Devices; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to improvements in the devices for measuring or testing wheat and other grain, in order to ascertain its quality, grade, and value.

Figure 1:
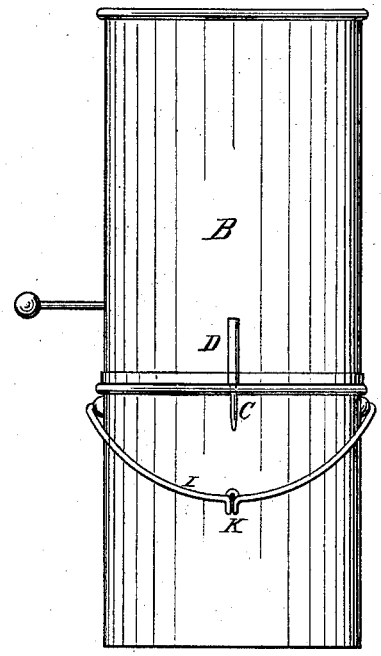
Figure 2:
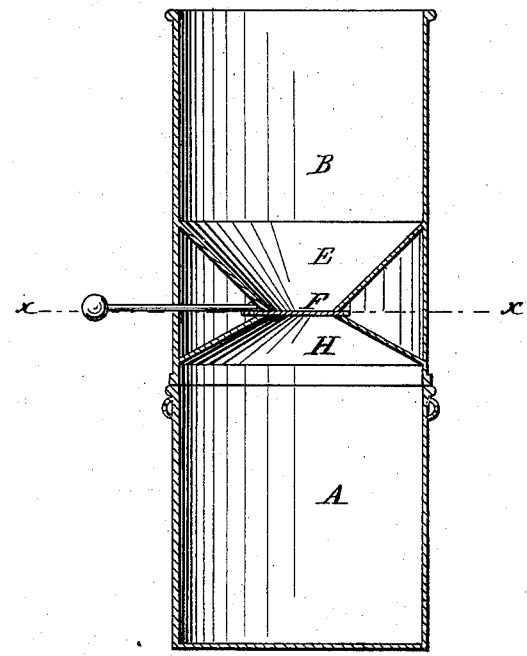
Figure 4:
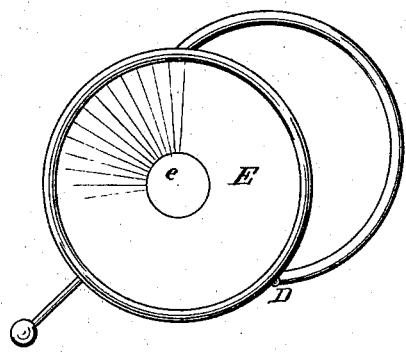
Figure 3:
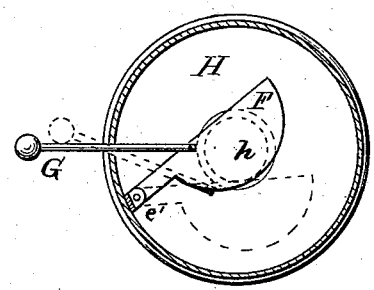

Figure 1 is a side elevation of my improved tester. Fig. 2 is a vertical section. Fig. 3 is a horizontal section on line $x\,x$, Fig. 2. Fig. 4 is a top-plan view.

In the drawings, A represents the testing or measuring vessel, and B the hopper or filling-vessel, which are of the same diameter, and preferably both are cylindrical.

The hopper B is placed on the top of the measure A, their rims being adapted to fit closely together. They are hinged together by means of a rod, C, secured to and projecting above the measure A, and a sleeve or socket, D, upon the filling-vessel B, into which the rod C is inserted. The filling-vessel or hopper B is divided by a partition or diaphragm, E, situated at its lower part. This diaphragm is conical, narrowing downward to the center, where it is provided with an aperture, $e$.

F represents a slide arranged to close the aperture $e$. Preferably it is pivoted to the wall of the hopper or below the diaphragm, as shown at $e'$.

G is a rod pivoted to the slide, and extending through the wall of the hopper, whereby the slide can be reciprocated beneath the aperture $e$ to open or close it at will. H is also a conical partition or diaphragm in the hopper, tapering upward toward the center, where it is provided with an aperture, $h$, corresponding to aperture $e$.

When the devices described are to be used to test grain, the hopper B is placed upon the measure A and attached thereto by means of rod C and socket D. The hopper is closed by the slide F, and is then filled with grain. The slide is again withdrawn, and the grain passes into the vessel A until the latter is full, after which the aperture is closed, and the grain in the measure is separated from that in the hopper. The hopper is then swung around upon the pivot-rod C, as shown in Fig. 4, and as it is swung around it strikes off the surplus grain in the measure, and leaves it evenly full. After this the hopper is detached from the vessel A, which is then weighed, it being provided, preferably, with a handle, I, and hook K, for supporting it when the weighing is to be done by steelyards.

It will be seen that by means of the conical diaphragm E and the conical chamber below the diaphragm H it is insured that the grain shall be distributed uniformly to all parts of the vessel A, and that said vessel shall be completely filled.

It is well known that in testing wheat and other grain with the devices now ordinarily used it is possible to manipulate the article to be tested so that its weight shall vary to a limited extent; and, further, that when the grain is placed in the measuring-vessel in the ordinary manner, it tends to enter and pack therein unevenly, and thus prevent an accurate test, which depends upon a true relation between the bulk and weight of the grain.

These difficulties are entirely obviated by my improved tester, which insures that the grain shall flow evenly and uniformly to the measure, and strikes it off with unvarying accuracy; and as the whole operation is carried on within closed vessels, it is impossible to improperly manipulate the grain.

What I claim is—

1. The combination, in a grain-tester, of the measuring-vessel A and the filling-vessel B, when hinged or pivoted together as shown at C D, so that the filling-vessel shall rest upon and inclose the top of the measuring-vessel, and be adapted to swing on the pivot in contact with said measuring-vessel, substantially as set forth.

2. The filling-vessel B, provided with the upwardly-flaring diaphragm E and the downwardly-flaring diaphragm H, substantially as set forth.

3. In combination with the filling-vessel B, provided with the diaphragms E and H, the plate F, pivoted at one point to the vessel, and at another point to the longitudinally-sliding rod G, substantially as and for the purposes set forth.

In testimony that I claim the foregoing as my own I affix my signature in presence of two witnesses.

JAMES N. STACY.

Witnesses:
 WILLIAM PORTEN,
 EDWARD P. SANBORN.